United States Patent
Hecker

(10) Patent No.: US 7,219,871 B2
(45) Date of Patent: May 22, 2007

(54) PYRAMID EASEL

(76) Inventor: Susan Rae Hecker, 18607 Breezy Palm Way, Boca Raton, FL (US) 33496-5148

( * ) Notice: Subject to any disclaimer, the term of this patent is extended or adjusted under 35 U.S.C. 154(b) by 119 days.

(21) Appl. No.: 10/763,831

(22) Filed: Jan. 22, 2004

(65) Prior Publication Data

US 2004/0135052 A1    Jul. 15, 2004

(51) Int. Cl.
*A47B 97/04* (2006.01)
(52) U.S. Cl. ............... 248/459; 248/441.1; 248/460; 446/487; 229/108.1
(58) Field of Classification Search ............ 248/441.1, 248/444, 456, 457, 459, 460, 469; 446/487, 446/488; 273/155; 206/737; D21/460; 229/116, 120.17, 120.02, 108.1
See application file for complete search history.

(56) References Cited

U.S. PATENT DOCUMENTS

| 1,821,060 | A | | 9/1931 | Isaacson |
| 4,109,892 | A | | 8/1978 | Hartung |
| 4,610,414 | A | | 9/1986 | Schuck |
| 4,993,989 | A | * | 2/1991 | Gidwani ................ 446/487 |
| 5,004,204 | A | | 4/1991 | Cook |
| 5,005,795 | A | | 4/1991 | Holmgren |
| 5,152,490 | A | | 10/1992 | Deutsch |
| 5,564,704 | A | * | 10/1996 | Yang ..................... 273/155 |
| 5,842,630 | A | * | 12/1998 | Remer ................... 229/116 |
| 5,921,398 | A | * | 7/1999 | Carroll .................. 206/736 |
| D413,147 | S | | 8/1999 | Ruff et al. |
| 6,523,826 | B1 | * | 2/2003 | Matos .................... 273/155 |
| 6,676,012 | B1 | * | 1/2004 | Southwell et al. ..... 229/120.17 |
| 2004/0003520 | A1 | * | 1/2004 | Trew ..................... 40/124.01 |
| 2005/0121588 | A1 | * | 6/2005 | Snuffer et al. ............ 248/459 |
| 2006/0012163 | A1 | * | 1/2006 | Shepps .................. 283/106 |
| 2006/0249565 | A1 | * | 11/2006 | Wood et al. ............. 229/164 |

* cited by examiner

*Primary Examiner*—Carl D. Friedman
*Assistant Examiner*—Tan Le

(57) ABSTRACT

A Pyramid Easel display holder for primarily flat objects includes ten main contiguous, triangular and polygonal (modified triangular) planes with additional contiguous triangular and trapezoid planes as part of optional base(s). On each of two display sides, objects are supported by a modified triangular center face, a triangular wing on each side of the center face, with two base options which brace the bottom of display objects, and aid in expansion control through friction with the surface support area. Front and mirrored back, and mirrored side wings, are connected by modified triangular swing arms, which are essentially the dynamic planar backsides of the front and back center pyramids, meeting at the crown of the embedded pyramids and "swinging" inside the center of the easel structure.

9 Claims, 4 Drawing Sheets

FIG. 7        FIG. 8        FIG. 9
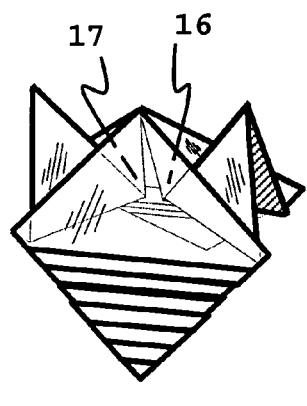
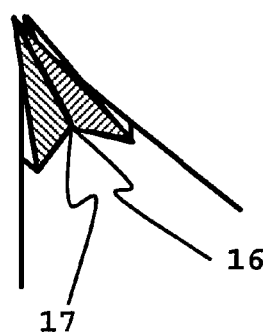
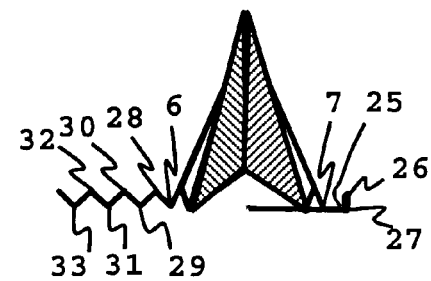
FIG. 10
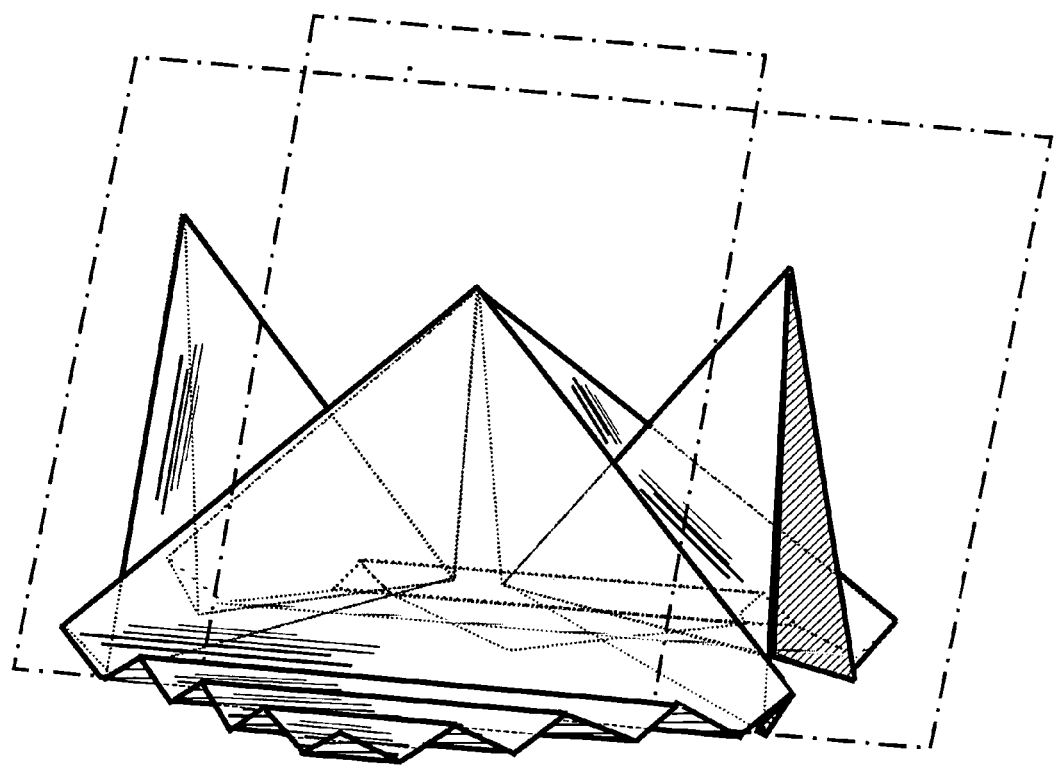

FIG. 11
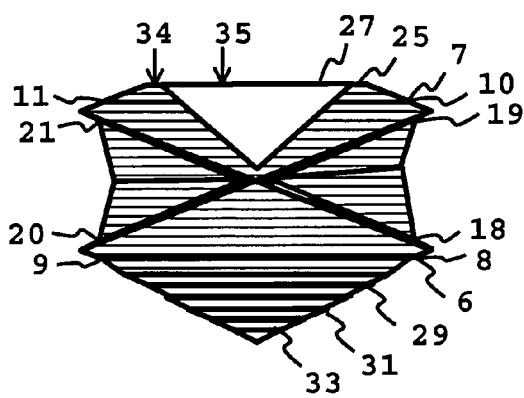
FIG. 12
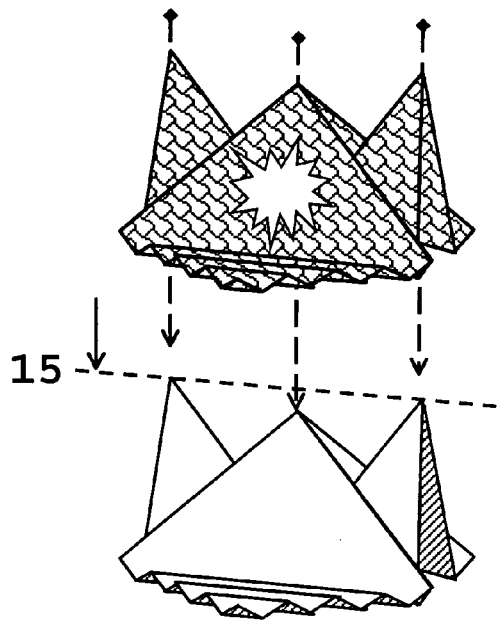
FIG. 13    FIG. 13.1
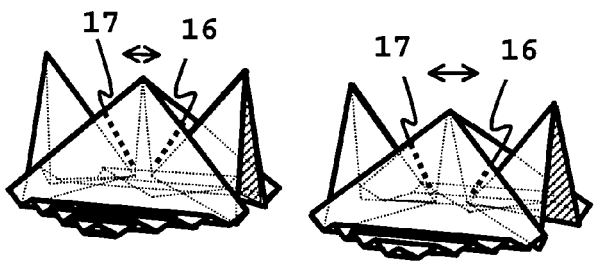
FIG. 14    FIG. 14.1
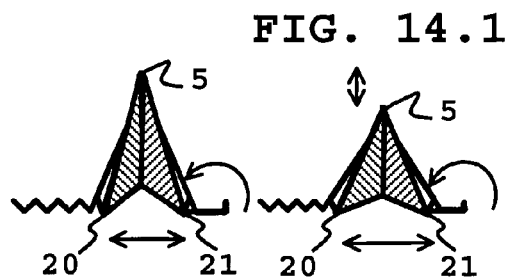
FIG. 15
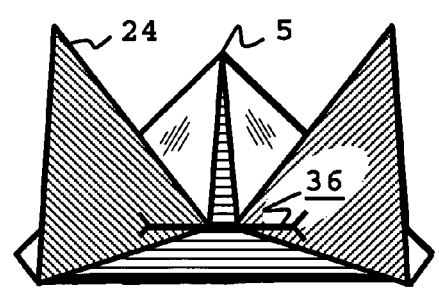
FIG. 16
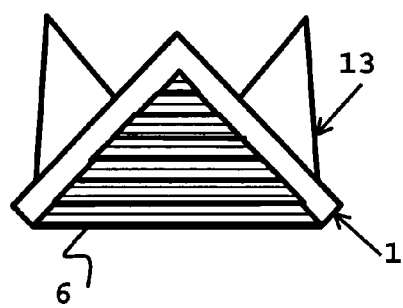

PYRAMID EASEL

BACKGROUND OF THE INVENTION

No prior research was done before the invention was composed. The invention evolved as a result of folding material to create a display holder for decorative greeting cards and art pieces.

Results of patent searches disclosed no utility or design patents with a composition of matter similar to the invention in structure, simplicity of assembly, useful scalability, the large scope of assembly material's options, and in composite functionality.

References to patents found in the fields of related art follow.

A classic easel is found in Multipurpose Easel, Holmgren, U.S. Pat. No. 5,005,795, Apr. 9, 1991; classifications: 248/449, 248/455, 248/465. While Holmgrem's easel contains one triangle display frame, and relies upon the weight of the display piece for stability, the Pyramid Easel invention incorporates three modified triangle frames/planes, each on two display sides, and has inherent greater stability with and without the weight of a display object. The swinging, attached arm and stabilizer 'foot' functionality in the Holmgren patent is enhanced in the Pyramid Easel invention by integrated easel and display object stabilization features combined with display face angle adjustability through easel expandability between 90 degrees to 155 degrees from the 'floor' or support surface for the easel.

Many patents make use of a square or rectangular base, coupled with a triangular side plane for support (Triangle Card Holder, Design 413, 147 Ruff et al 8/99, class D19/88; Display Easel with Self-Adjusting Paper Clamp, U.S. Pat. No. 5,152,490, Deutsch Oct. 6, 1992, class 248/452, 40/341, 248/316.3, 248/457, 40/341; Book Rest, U.S. Pat. No. 1,821,060, Isaacson 9/31, Class 248/455; Studio Easel, U.S. Pat. No. 5,004,204, Cook Apr. 2, 1991, class 248/449, 451, 452, 453, 455, 463, 456, 457, 460, 464, 465; Easel, U.S. Pat. No. 4,610,414, Schuck Sep. 6, 1986, class 248/449, 248/464; Adjustable Easel, U.S. Pat. No. 4,109,892, Hartuag Aug. 29, 1978, class 248/449, 248/455, 248/458, 248/464.

While Ruff and Hartuag patents are double-sided, the Ruff, Deutsch, Schuck, Isaacson patents have no horizontal extensibility. Hartuag attaches a triangular arm extending out from the side, but involves complex assembly and portability, as with the Cook patent. All these patents' primary display face planes are rectangular, except for Cook, and unlike the triangular-like face planes of the Pyramid Easel invention.

While Easel, U.S. Pat. No. 3,809,354, Phifer, May 7, 1974 has a triangular face plane, it is single-sided and has relatively complex assembly and portability.

The Glick patent (Easel for Displaying Cards and the Like, U.S. Pat. No. 5,388,798 Feb. 14, 1995, 248/459, 248/453) has many functional advantages similar to the Pyramid Easel, including simplicity, economy, adjustability, strength, and portability. The embodiments, i.e., composition of matter, of the Pyramid Easel are entirely different, allowing limitless decorative treatments; in the Pyramid Easel, further functional enhancements include expanded materials and construction options, enhanced horizontal extensibility and display angle adjustment range, a stackable characteristic for added strength and decorative value, and the inclusion of two display holder sides.

BRIEF SUMMARY OF THE INVENTION

The pyramid easel, a display holder for supporting generally flat items, is composed of ten main contiguous, triangular and polygonal (mostly modified triangular) planes with additional contiguous triangular and trapezoid planes as part of optional base(s). In one embodiment, arcs replace angle vertices for rounding edges, points, and corners of an easel. The easel can be assembled from one planar square of material that is flexible, resilient, holds a fold or bend, and maintains plane and plane edge shape integrity. The easel is two-sided; each mirrored side includes three mostly triangular faces (one main face and two wing faces); each side can be used for supporting display objects. The pyramid easel is collapsible to flat in assembled embodiment (depending upon the thickness of the material utilized), expandable, fully scalable, stackable, intrinsically strong and stable (more so with the weight of display objects), easy to assemble, and inherently decorative. The easel is suitable to a number of simple assembly or manufacturing processes. The easel can be constructed in a frame embodiment from the edges of the intersecting planes and the sides of a material square, or inclusive with decorative plane surfaces.

Two optional bases are presented; Base 1 includes a single "tray" for bracing the bottom of display object(s), and which rests on the surface support area; Base 2 has three to four angled "trays" in a waterfall effect, whose plane edges rest on the surface support. Base 2 might be appropriate for an office desk card, art, pen & pencil holder, or each "tray" used as an alternative means to facilitate different display angles or to hold or store multiple display objects at one time. In one application, an 8"×8" material square yields a collapsed, flat easel which fits into standard number 10, and most greeting cards, envelopes, and which easily holds the contents of the envelope when expanded.

The Pyramid Easel's usefulness is in the unique comprehensive combination of benefits found inherent in the easel's composition. These benefits include more easel balance and stability, innate horizontal extensibility, which self-adjusts for more horizontal support as the easel expands and the display angle flattens, and strength; these benefits support the easel's handling of more varied sizes and weights of display objects relative to the weight and scale of the easel. In addition, the Pyramid Easel can be easily assembled from one square of multiple material choices into planes or plane edges (frame embodiment), fully scalable, collapsible to flat (a mailer insert on a very small scale), stackable in assembled easel embodiments, and portable. It is inherently decorative, but can incorporate unlimited decorative treatments.

DESCRIPTION OF THE SEVERAL VIEWS OF THE DRAWING

Note: For clarity and consistency across views, and where meaningful, the topside of a material is white, the bottom or under-side of a material is illustrated with a consistent pattern of horizontal lines.

FIGS. 2 through 9 illustrate the steps in an assembly of an easel, following after the composition of FIG. 1.

FIG. 2 is a top view of FIG. 1 in slight left perspective beginning assembly.

FIG. 3 is a top view of FIG. 1 in slight right perspective proceeding with assembly.

FIGS. 4, 5, 6, and 7 are semi-transparent front left perspectives in sequential assembly steps, resulting in an assembled easel with pre-assembled bases.

FIG. 8 is a side view of FIG. 7.

FIG. 9 is a side view of an assembled easel with assembled bases in upright position.

FIG. 10 is a front left perspective view of an assembled easel and bases with transparent surfaces, illustrating the edges of bent/folded planes. Included are both a tall and a wide rectangular representation of a display object held by an easel.

FIG. 11 is a bottom view of an assembled easel and bases illustrating all contact points, lines, and planes with the surface support.

FIG. 12 includes two assembled easels in front left perspective, illustrating the stackable activity by means of dashed projection lines in the direction of movement and fit. A cross section reference line, with an arrow in the cut direction, refers to FIG. 15.

FIG. 13 and FIG. 13.1 are each transparent front left perspective views; the latter illustrates a further expanded easel in comparison to FIG. 13.

FIG. 14 and FIG. 14.1 are each side views of FIGS. 13 and 13.1, the latter illustrating a further expanded easel in comparison to FIG. 14.

FIG. 15 is a cross section view of an assembled easel illustrating an easel having an expansion control device and the device's position within an easel. This view is sourced from FIG. 12.

FIG. 16 is a front view of a collapsed, assembled easel in mailer incorporation.

DETAILED DESCRIPTION OF THE INVENTION

Figure 1:
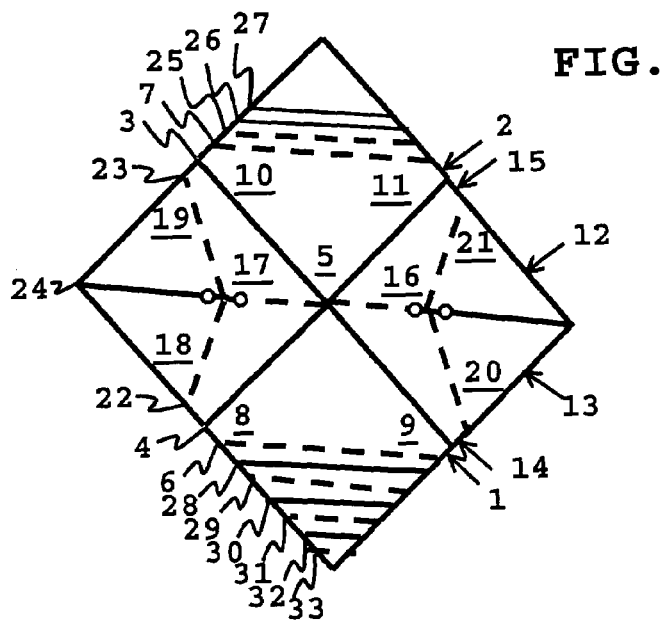
FIG. 1 shows the top view in slight right perspective of a 2D pre-assembled easel with constructed fold/plane edge lines.

A pre-assembled easel is illustrated in FIG. 1 as a square of material shown in diamond shape to denote what will be the front and rear side large modified right triangle planes in an assembled easel at the top and bottom of the diamond (planes FIG. 1:1,2).

The material used in this assembly process must be flexible to be folded or bent, and resilient enough to maintain the integrity of each plane and plane edge. An assembled easel has the ability to hold multiple mostly flat display objects at one time; display objects can include cards, placards, photos, books and framed art of various sizes and weights, depending upon the scale of the easel relative to the display objects.

The easel planes are constructed by creating and positioning two types of fold lines, which are the easel planes' edges. In this assembly process, each type of fold line becomes a focus axis of rotation of the material on either side of the fold line into 3D space at the instance of the specific folding activity.

A solid fold line, type one, denotes a folding motion "down", with the top side of the material facing "up", rotating each side of the material simultaneously about the rotational axis fold line, thus lessening the distance in space between the undersides of the material. Along a solid fold line, the material is folded together ultimately creating a convex top surface of the material in an assembled easel.

A dashed fold line, type two, denotes a folding motion in the opposite direction, that is, folding the top surfaces of the material together simultaneously, and creating a smaller distance in space between the top surfaces of material as they are rotated towards each other about the dashed line folding axis. This folding activity results in a concave top surface about the dashed fold line in an assembled easel. Scoring or indenting (creating suitable surface weakness) on the top surface along dashed lines and underside surface along solid fold lines of the material square, when appropriate to the material used, facilitates the fold or bend in the appropriate final direction.

The process of constructing the fold lines creates the dimensions of the contiguous planes relative to the size of the material square:

For front and back center modified triangular planes/faces (1:1,2), involves:

Creating and drawing two perpendicular solid lines, intersecting at the center of the square (point 1:5); each line (1:3,4) bisects opposing sides of the square. Point 1:5 is the center top of the easel. The major two face planes (1:1,2) will be convex to the center top in an assembled easel.

Then, calculating 0.0625 multiplied by ($1/16^{th}$ of) the length of a side of the material square, and marking this distance from each intersection of lines 1:3,4 with each edge, and on opposing sides of lines 1:3,4 as end points of dashed lines 1:6,7.

Then, constructing dashed lines 1:6,7 by connecting the end points (1:8 and 1:9, then 1:10 and 1:11, respectively). Dashed fold lines 1:6 and 1:7 are each bases of the center planes/faces and will rest on a surface support.

The process of constructing fold lines for the easel sides:

Planes 1:12, 13, 14,15 comprise one of two easel sides. Planes 1:12 and 1:13 comprise a "wing", and together create a convex surface in an assembled easel; Planes 1:14 and 1:15 are "swing" arms, and create concave surfaces relative to the wings and each other in an assembled easel. Opposing mirrored wing and swing arm planes comprise a second side of the easel.

Constructing point 1:17 (and for the other side, 1:16) is the key to the creation of the side' (s') fold lines. This is accomplished by calculating 0.0625 multiplied by one side of the material square, and marking this distance along the material edge from line 1:4's intersection with the plane edge in the opposite direction of line 1:6's intersection with the edge of the material square. This creates point 1:18.

Continue on by creating and marking point 1:19 at the same distance, measuring from line 1:3 and away from line 1:7's intersection with the edge of the material square.

Then, constructing an obtuse angle of 115 degrees using Point 1:18 as the vertex, and the line it lies upon (edge of material square) as the initial side of the angle. The terminal side of this angle will become line 1:22.

Then, constructing an obtuse angle of 115 degrees using Point 1:19 as the vertex, and the line it lies upon (edge of material square) as the initial side of the angle. The terminal side of this angle will become line 1:23. The intersection of lines 1:22 and 1:23 is the end point of each respective dashed fold line (point 1:17), and at the same time lies on the convergent line between the side wing planes (line 1:24). Line 1:24 bisects the wing corner of the material square and passes through the center of the square (point 1:5).

Then, constructing a dashed fold line from point 1:5 to point 1:17; and a solid fold line from point 1:17 to the wing side edge of the material square (this line, 1:24, lies on the diagonal line of the material square).

To construct the folding lines of the other side, in the same manner as described above, construct point 1:16 by creating, first, points 1:20 and 1:21, then constructing the 115 degree angles from the points as vertices, and marking their intersection (point 1:16). Then, completing and marking the wing junction solid fold line from point 1:16 to the closest material square corner, along the material square diagonal; as well as the dashed fold line between point 1:16 and point 1:5, also along the same diagonal.

The process of constructing the base(s) fold lines:

For Base 1 option (folding lines 1:7,25,26,27):

Dashed line 1:7 rests on the support surface in an assembled easel, as does the plane bounded by lines 1:7 and line 1:25. Construction of line 1:25 includes calculating 0.03125 multiplied by the length of one side of the material square.

Then, moving that distance along the edge of the material plane from line 1:7; this is an endpoint of line 1:25.

Then, repeating the calculation and moving the same distance in the same direction on the opposite side of the base plane (uppermost triangle in FIG. 1, which is bounded by line 1:7 and the "corner" edges of the material square). Lines 1:7, 1:25, 26, and 27 are parallel on the Base 1 option plane, and the same distance apart (0.03125 multiplied by a side of the material square).

For Base 2 option (folding lines 1:6,28-33) the process includes:

Calculating the Base 2 option fold lines in the same manner as described above for the Base 1 option lines, i.e., calculating 0.03125 multiplied by one side of the material square, and moving that distance along the material square edges toward the end of the base triangle/corner of the square. Line 1:6 is the starting reference line. Then, alternating and marking solid and dashed construction lines equidistant and parallel to line 1:6 in the direction towards the nearest corner of the material square.

Assembly of the pyramid easel:

Machine or manual indenting/scoring of the fold lines:

Scoring or indenting on the top of the material surface along dashed lines, and on the underside surface along solid fold lines, when appropriate to the material used, facilitates the fold or bend in the appropriate final direction, that is, solid lines' folding activities convey convex relationships among adjacent top surface planes and dashed lines' folds result in concave relationships among adjacent top surface planes. Applying downward pressure to the top surface of the material at points 1:16 and 1:17, in a direction bringing the points closer to each other in 3D space, angles the surface planes in the appropriate direction along the plane edges/fold lines (lines of weakness), resulting in FIGS. 7 and 8. Base(s) folding results are illustrated in FIG. 9.

The specific steps for manual folding assembly include:

Where manual folding/bending of the material is required for each fold line, the following intermediate steps, fold line by fold line, can be taken to result in FIGS. 7 and 8.

Figure 2:
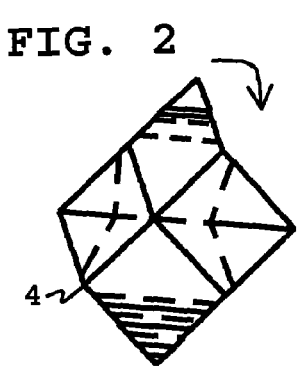

Referencing FIG. 2, folding the material square along line 2:4, creating an angle less than 180 degrees between the undersides, and an angle greater than 180 degrees between the top surface planes on either side of the line.

Figure 3:
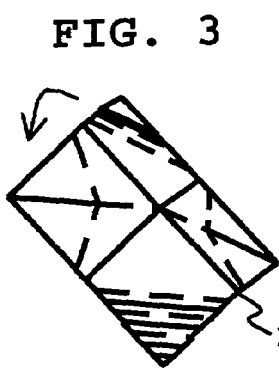

Referencing FIG. 3, folding the material square along line 3:3, creating an angle less than 180 degrees between the underside surfaces, and an angle greater than 180 degrees between the top surface planes on either side of the line.

Figure 4:
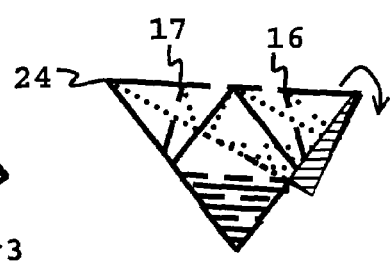

Referencing FIG. 4, bending the material square along the diagonal (line 4:24) (angle greater than 180 degrees between top surface planes, angle less than 180 degrees between underside material surface planes), applying specific folding pressure/creating creases only along the solid line segments at each corner end of the diagonal (along line 4:24 to points 4:17 and 4:16, respectively).

Figure 5:
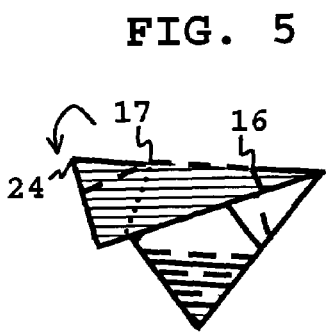

Referencing FIG. 5, flipping the material surface over with the underside surface "up", bending the underside surface (creating an angle greater than 180 degrees between underside surface planes, angle less than 180 degrees between top surface planes) along the same diagonal (5:24) as FIG. 4 (4:24), only applying folding pressure/creating creases along the dashed line segments (between points 5:17 and 5:16).

Figure 6:
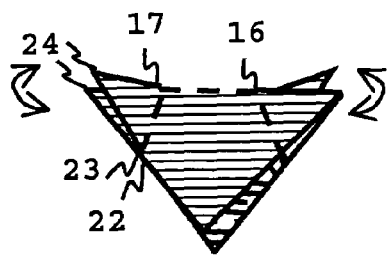

Referencing FIG. 6, using the same diagonal bend as in FIG. 5, but closer to a 180 degree fold, applying folding pressure/creating creases along the dashed lines 6:22 and 6:23 simultaneously (junction on material diagonal line (6:24) at point 6:17), and for their opposing counterpart lines, whose junction on the diagonal line (6:24) is point 6:16). Create a double crease/fold in both 180 degree directions by first creasing the dashed line at a positive 180 degree, and then at a negative 180 degree angle, shown by the double headed direction arrows on each side of FIG. 6.

Then, flipping the material back over along the diagonal, returning to an approximate 45 degree acute angle between the underside surface planes and with the top surfaces "up" (material square bend as in FIG. 4).

FIG. 7 illustrates the forming of the wing sides after applying pressure to each point 7:17 and point 7:16, which conforms the material and assembles the wing and swing arm sides of the easel. FIG. 8 displays a side view of FIG. 7 to clarify the final positions of points 8:17 and 8:16.

Base 1 (folding lines 9:7, 25, 26, 27) and Base 2 (folding lines 9:6, 28,29, 30, 31, 32, 33) assembly instructions include:

FIG. 9 displays the side view of the final assembly of the easel with the Base 1 option and Base 2 option, each placed on opposite sides of the two-sided easel. Either, both, or another base option can be utilized depending upon the target easel user and target objects for display.

Base 1 option is a single tray resting on the surface support. The plane bounded by dashed folding lines 9:7 and 9:25 is the tray, and the width of the tray can be variable. When the easel is folded flat (vertical to the support surface), begin by folding lines 9:7 and 9:25 sequentially to a 90 degree angle, resulting in their bounded trapezoid plane parallel to the surface support.

Then, folding solid line 9:26 back 180 degrees to reinforce the "lip" of the "tray"; then, folding solid line 9:27 another 90 degrees in the same direction as line 9:26, and under the "tray", which extends the corner triangular plane underneath the easel to rest upon the surface support area.

Base 2 option is simply assembled by sequentially folding, respectively, negative, then positive, 90 degree angles, such that the dashed folding lines (9:6, 29, 31, 33)/plane edges rest on the surface support.

FIG. 10 displays the assembled pyramid easel with a semi-transparent top surface, and with the Base 2 option in the front, and the Base 1 option in the back. Two flat display object representations, one long, one tall, shown as dashed rectangles, rest in the Base 2 tray closest to and up against the front center face of the easel, illustrating how the easel supports display objects.

FIG. 11, the bottom view of the assembled easel, illustrates the corner, feet points of the basic easel (11:10,19,18, 8,9,20,21,11), which rest on the surface support area. When a scratch resistant application is needed to mitigate the easel material's scratch potential, these are the points, along with the following planes and lines of the Base options, where a scratch resistant material or product can be optionally applied. A fast drying liquid plastic or longer wearing rubber or a derivative product, for example, is not only scratch resistant, but also acts with friction as an additional "stopper" in controlling easel expansion, enabling even more or heavier objects to be supported.

Base 1 option planes, which rest on the surface support area, are 11:34 and 11:35. Trapezoid plane 11:34 is bounded by lines 11:7 and 11:25. Triangular plane 11:35 joins the rest of the easel at line 11:27.

Base 2 option lines, which rest on the surface support area, are 11:6 (junction with the basic easel), 11:29, 11:31, and 11:33.

FIG. 12 illustrates the stackable nature of the easel for decorative effect variations and for added strength. FIG. 12 displays three dashed projection lines going from a top assembled easel to another assembled easel below it. These projection lines show how two easels fit together vertically. Added to FIG. 12 is a cross section cut line with downward directional arrow, to be used as the source of cross section view, FIG. 15.

FIGS. 13, 13.1 (left front perspective) and FIGS. 14, 14.1 (side view) illustrate the expandable attributes of the easel, which allow adjustable angles of display for display objects. Depending upon the weight and size of the display object and the material used to assemble the easel, the easel will self adjust to a stable expansion position. Between FIGS. 13 and 13.1, and between FIGS. 14 and 14.1 there is an approximate 10 negative angle degree difference (shown in the arrowed arc differences between FIGS. 14 and 14.1). When the easel is expanded, points 13/13.1:17 and 13/13.1: 16 of the 'swing arm' and 'wing planes' move apart and closer to the support surface. This is also shown in FIGS. 14 and 14.1, where the easel's height from the support surface is decreased (movement arrow next to point 14.1:5), with the flattening of the angle of display on both sides/faces of the easel (arc references on FIGS. 14 and 14.1). Points 14/14.1: 20 and 14/14.1:21 where the 'wings' rest on the support surface, move apart as the angle of display widens and the easel expands.

FIG. 15 (cross section through material diagonal line 1/15: 24, passing through wing tips and point 1/15:5 center top of the easel) illustrates the positioning of an expansion control device (15:36), which enhances the inherent stability of the easel for more shapes and weights of single or multiple flat display objects to be supported by the easel.

This expansion control device, if of a heavier/denser material then the easel's material, can also act as an anchor further stabilizing the easel when not supporting an object. The length of an expansion control device is suggested at 0.25 to 0.375 multiplied by the length of one side of the original material square. The thickness or gauge of the device can be derived from the size of the holes (reference FIG. 1, the four holes, one on each side of both points 1:17 and 1:16, and all four positioned on/within the diagonal line 1:24), which must be practicable in diameter relative to the width of the folding lines, creases, plane edge or constructed easel frame.

An expansion control device can be a slider type, such as, for example, a straight smooth pin capped at either end, or a simple non-safety pin, hooked to itself underneath the "swing arms" points 1/13:17,16 after sliding the top of the pin through the holes adjacent to the same points. In this instance the expansion control device simply stops the expansion at a certain distance.

With an expansion control device in the form, for example, of a stud screw (with opposing oblique screw threads at either end equidistant from the center of the uncapped screw), or in the form of a no-headed screw, with wing nuts attached at each end of the screw, the easel expansion can be adjusted on both sides of the easel, under the wings, and fixed at a certain angle of display. This manual procedure involves twisting the wing nuts at either end of the screw inward or outward at the bottom of the easel wing planes to achieve a specific angle of display for the display object. The holes in the easel, along with a compatible easel material, must support the screw movement in size, resiliency, and strength. Another view of the positioning of an expansion control device can be seen in FIG. 18:36.

FIG. 16 illustrates the front view of an assembled easel in mailer (collapsed, flat) incorporation. Plane 16:1 is an easel front face; plane 16:13 is a wing plane. In front of the front face of the easel is an unassembled base (Base option 2 shown), which has been folded along line 16:6 to a 180-degree angle from its unassembled embodiment, to lie up against a front face. The width of the material used determines the flatness achieved. An 8 inch by 8 inch material square, when assembled and collapsed as a mailer, easily fits inside a number 10 envelope, as well as inside most greeting card envelopes, and, when assembled/expanded, holds multiple greeting cards, photos, and other flat mailed insertions at one time, with or without an expansion control device (FIG. 15/18:36) or any applied surface contact "stoppers" at surface support contact points, as displayed in FIG. 11.

Figure 18:
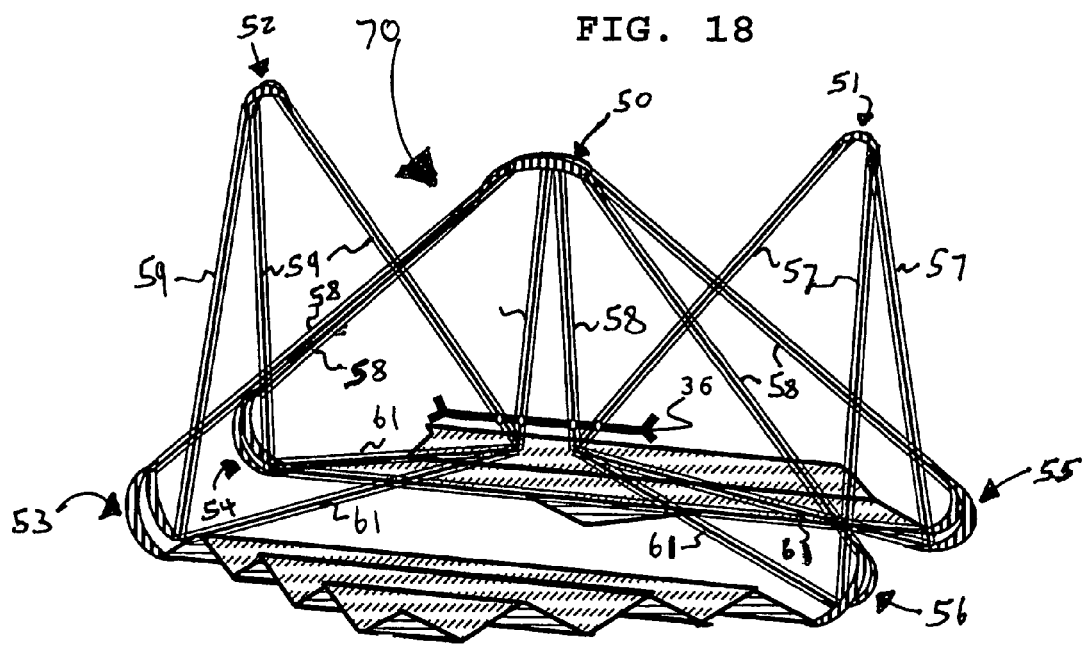
FIG. 18 is a left front perspective view of a rounded pyramid easel in frame embodiment, and having an expansion control device.

Another embodiment of the pyramid easel mitigates the potentially sharp points of the top surface (FIG. 10), and is shown in FIG. 18 in frame (plane edges) embodiment. The target application of the easel and the material selected for construction or assembly, aid in the choice of whether to assemble an easel in plane or frame embodiment. A plane embodiment here is characterized by an easel having any of its plane surfaces connecting, at least once, to each linear and curvilinear edge of the respective plane.

Base 1 and Base 2 options are shown unchanged from FIG. 10 in FIG. 18. Pointed and potentially sharp edges at fold lines and on the outside edge of the material square can be improved by the material selected, bended or rounded folds, and by rounding, in an appropriate manner to the material selected, the four square edges of the pre-assembled easel's material square.

Figure 17:
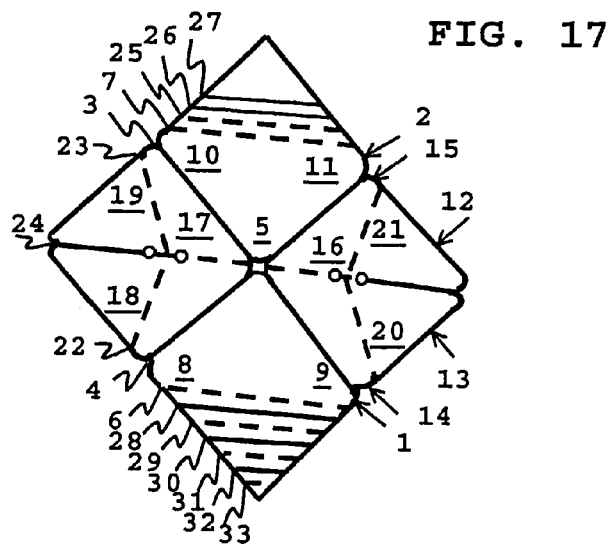
FIG. 17 is a top view of an altered pre-assembled easel (altered from FIG. 1 only for rounded points, edges, and corners).

FIG. 17 illustrates the changes to the pre-assembled easel (FIG. 1) to round corners of specific planes, not mitigated by the activities stated in the previous paragraph, while maintaining the same basic composition of matter. The changes include the following.

All planes' vertices intersecting at point 17:5 are filleted, applying convex arcs in place of the top, corner angle vertices, for, and relative to each angle's measurement in, each respective plane (Planes 17:1, 2, 14 and 15, and the two complement, opposing "swing arm" planes to 14 and 15). Depending upon the width of the plane edges, and/or size of the folds, and the thickness of the material, these planes' top arcs and their edges still intersect each other in much the same manner as in FIG. 1 (original pre-assembled material square). The top of each arc optimally should approach Point 17:5 as closely in planar distance as is feasible for assembled easel structural stability, for ease in folding assembly, and for a fully collapsible easel, as in FIG. 16 (showing the mailer incorporation).

Twelve angle vertices are converted to arcs on the edges of the material square. These include 'bottom' corner angles of the front and back face planes (17:1 and 17:2), as well as the outside angles of the "swing arm" planes (17:14 and 17:15 and their opposing, mirrored planes). Four angles converted to arcs intersect each edge of the material square at the endpoints of line 17:3; and the opposing four intersect each endpoint of line 17:4 (at each outside edge of the material square).

Re: Planes 17:12 and 13, the side "wing" planes, and their opposing mirrored "wing" planes (each pair of "wings"/planes intersect each other along the diagonal line 17:24). The outside corner angle vertices lying along diagonal line 17:24 of each of the four "wing" planes are replaced with convex arcs of the same angle measurement.

Although Base option 1 and Base option 2 portions of FIG. 17 are identical to the same portions of FIG. 1, replacing trapezoid and triangle corner angles with arcs, if further mitigation of sharp edges is required, can be constructed as previously described and applied to the pre-assembled embodiment illustrated in FIG. 17.

FIG. 18 displays the assembled easel in frame embodiment, as a result of the pre-assembled FIG. 17 material square. Many applications of the easel may require the safety consideration of rounded surface edges, as opposed to sharp, pointed surface edges.

FIG. 18 is assembled in the same manner as illustrated and described in FIGS. 1 through 9 (but replacing FIG. 1 with FIG. 17).

Also illustrated in FIG. 18 is an easel having an expansion control device (18:36), as previously illustrated and described in FIG. 15:36.

An easel frame 70 comprises a first plurality of arced vertices 50 registered at a center of the frame 70 and elevated above a ground surface (not shown). A first plurality of arms 58 monolithically are formed with the first plurality of arced vertices 50 wherein the first plurality of arms 58 extend linearly and outwardly from the center of the frame 70. Second and third pluralities of arced vertices 51, 52, respectively, are laterally spaced from the first plurality of arced vertices 50 wherein each of the second 51 and third 52 pluralities of arced vertices are equidistantly displaced from the first plurality of arced vertices 50. Second and third pluralities of arms 57, 59, respectively, are monolithically formed with the second 51 and third 52 pluralities of arced vertices respectively. Each of the second 57 and third 59 pluralities of arms travels linearly and downwardly from the second 51 and third 52 pluralities of arced vertices and terminating at the ground surface. Fourth, fifth, sixth and seventh pluralities of arced vertices 53-56, respectively, are equidistantly spaced from the first plurality of arced vertices 50 and monolithically formed with axially opposed ends of the first, second and third pluralities of arms 58, 57 and 59, respectively. A fourth plurality of arms 61 are monolithically formed with selected ones of the fourth 53, fifth 54, sixth 55 and seventh 56 pluralities of vertices wherein the fourth plurality of arms 61 linearly extend inwardly towards the center of the frame 70 and terminate beneath the first plurality of vertices 50.

The second 57 and third 59 pluralities of arms are coextensively shaped wherein the fourth 53, fifth 54, sixth 55 and seventh 56 pluralities of arced vertices are offset at an obtuse angle from an associated edge of the frame 70. The easel frame further includes an expansion control device 36 removably connected to selected ones of the second 57 and third 59 pluralities of arms for allowing the user to adapt the easel frame 70 between alternate shapes without reducing a structural integrity of the easel frame 70.

I claim:

1. An easel for holding flat display objects such as cards, placards, photos and other like flat objects, said easel comprising:
    a square-shaped body formed from flexible material;
    a plurality of fold lines drawn on said body wherein each of said fold lines defines an axis of rotation, said fold lines including solid fold lines and dotted fold lines respectively marked on said body;
    a plurality of surface weaknesses scored on said body, wherein said surface weakness are scored along a top surface of said body for said solid fold lines, said surface weakness being scored along an underside surface of said body for said dotted fold lines; and
    said body being folded in a first direction about said solid fold lines and further being folded in a second direction about said dotted fold lines, wherein said solid fold lines create convex relationships among adjacent top surface planes of said body and said dotted fold lines create concave relationships among the adjacent top surface planes of said body;
    wherein said body is adapted from a two dimensional arrangement to a three dimensional arrangement when a user applies downward pressure to selected portions of said body;
    wherein said body further comprises a plurality of contiguous planes constructed on said body by folding selected ones of said fold lines; a plurality of bases constructed on said body by folding other ones of said fold lines; two perpendicular ones of said solid fold lines that intersect at a center of said body, each of said perpendicular solid fold lines bisecting at opposing sides of said body; and a first plurality of said dotted fold lines extending across said body from one of said body sides to another one of said body sides, said first plurality of dotted fold lines being positioned a first distance measured from selected ones of said bisections of said perpendicular solid fold lines, said first distance being equal to a product of .0625 and a length of a side of said body.

2. The easel of claim 1, wherein said easel further comprises:
    a second plurality of said dashed fold lines extending between a second plurality of marks, said second plurality of marks being located adjacent to other ones of the opposing sides of said body that is equal to said first distance measured from other ones of said bisections of said perpendicular solid fold lines;
    a plurality of obtuse angles measured from a plurality of vertices defined at said bisection of said perpendicular solid fold lines wherein terminal sides of said obtuse angles are defined by said opposing sides of said body;
    a third plurality of said plurality of dotted fold lines drawn from each of said sides of said body to selected ones of said perpendicular solid fold lines respectively;
    a fourth plurality of said plurality of dotted fold lines drawn from said center of said body to terminating ends of said third plurality of dotted fold lines that are measured along said obtuse angles; and
    a first plurality of said plurality of solid fold lines drawn from an intersection of said third and fourth pluralities of dotted fold lines to a wing side edge of said body.

3. The easel of claim 1, further comprising:
    a third plurality of marks placed on said body that is equal to a second distance measured from an intersection of said first plurality of dotted lines and selected ones of said opposed sides of said body, wherein said second distance is equal to a product of 0.03125 and a length of one of said sides of said body;

a fifth plurality of said dashed fold lines by connecting said third marks to each other; and a fourth plurality of marks placed on said body that is equal to said second distance measured from an intersection of a fifth plurality of dotted lines and one of said sides of said body.

4. The easel of claim 3, further comprising:

an expansion control device directly connected to said body for enhancing inherent stability of said easel such that said easel can hold a variety of the display objects;

wherein said expansion control device comprises one of a straight smooth pin and a non-safety pin.

5. The easel of claim 4, wherein said body further comprises:

a plurality of wings formed at opposed sides of said easel wherein said wings have convex surfaces; and a plurality of swing arms formed at opposed sides of said easel wherein said swing arms have concave surfaces positioned relative to said wings.

6. An easel frame comprising:

a first plurality of arced vertices registered at a center of said frame and elevated above a ground surface;

a first plurality of arms monolithically formed with said first plurality of arced vertices wherein said first plurality of arms extend linearly and outwardly from the center of said frame;

second and third pluralities of arced vertices laterally spaced from said first plurality of arced vertices wherein each of said second and third pluralities of arced vertices are equidistantly displaced from said first plurality of arced vertices;

second and third pluralities of arms monolithically formed with said second and third pluralities of arced vertices respectively, each of said second and third pluralities of arms traveling linearly and downwardly from said second and third pluralities of arced vertices and terminating at the ground surface;

fourth, fifth, sixth and seventh pluralities of arced vertices equidistantly spaced from said first pluralities of arced vertices and monolithically formed with axially opposed ends of said first, second and third pluralities of arms respectively; and a fourth plurality of arms monolithically formed with selected ones of said fourth, fifth, sixth and seventh pluralities of vertices wherein said fourth plurality of arms linearly extend inwardly towards the center of said frame and terminate beneath said first plurality of vertices.

7. The easel frame of claim 6, wherein said second and third pluralities of arms are coextensively shaped.

8. The easel frame of claim 6, wherein said fourth, fifth, sixth and seventh pluralities of arced vertices are offset at an obtuse angle from an associated edge of said frame.

9. The easel frame of claim 6, further comprising: an expansion control device removably connected to selected ones of said second and third pluralities of arms for allowing the user to adapt said easel frame between alternate shapes without reducing a structural integrity of said easel frame.

* * * * *